(12) United States Patent
Hill et al.

(10) Patent No.: US 12,443,994 B2
(45) Date of Patent: Oct. 14, 2025

(54) MIDPOINT COMPUTATIONS AT INTERVALS WITH BALANCED GROUPS

(71) Applicant: TSX INC., Toronto (CA)

(72) Inventors: David Edward Hill, Toronto (CA); Emma Victoria Moogk, Toronto (CA)

(73) Assignee: TSX INC., Toronto (CA)

( * ) Notice: Subject to any disclaimer, the term of this patent is extended or adjusted under 35 U.S.C. 154(b) by 163 days.

(21) Appl. No.: 18/209,791

(22) Filed: Jun. 14, 2023

(65) Prior Publication Data

US 2023/0410196 A1    Dec. 21, 2023

Related U.S. Application Data

(60) Provisional application No. 63/352,468, filed on Jun. 15, 2022.

(51) Int. Cl.
*G06Q 20/40* (2012.01)
*G06Q 40/04* (2012.01)
*H04L 9/40* (2022.01)

(52) U.S. Cl.
CPC .................................. *G06Q 40/04* (2013.01)

(58) Field of Classification Search
None
See application file for complete search history.

(56) References Cited

U.S. PATENT DOCUMENTS

| | | | |
|---|---|---|---|
| 7,444,300 B1 | 10/2008 | Broms et al. | |
| 7,689,501 B1 | 3/2010 | Gastineau et al. | |
| 7,865,426 B2 | 1/2011 | Volpert | |
| 8,001,033 B2 | 8/2011 | Brandes et al. | |
| 8,131,632 B2 * | 3/2012 | Friedman | G06Q 40/04 705/37 |
| 8,311,926 B1 * | 11/2012 | Zeigler | G06Q 40/04 705/37 |
| 8,719,138 B2 | 5/2014 | Brennan | |
| 8,732,065 B1 | 5/2014 | Hayes, Jr. | |
| 11,257,155 B2 | 2/2022 | Wiesner et al. | |
| 2003/0154157 A1 * | 8/2003 | Kokis | G06Q 40/04 705/37 |
| 2010/0268638 A1 | 10/2010 | Wunsch et al. | |
| 2010/0287087 A1 | 11/2010 | Bartko et al. | |
| 2013/0066801 A1 | 3/2013 | Phillips | |
| 2014/0180893 A1 | 6/2014 | Dale et al. | |

(Continued)

FOREIGN PATENT DOCUMENTS

KR    20220007315 A    1/2022

OTHER PUBLICATIONS

Nguyen et al., "An Analysis of the Opening Mechanisms of Exchange Traded Fund Markets", The Quarterly Review of Economics and Finance 49.2 (2009): 562-577.

*Primary Examiner* — Bennett M Sigmond
*Assistant Examiner* — Bhavin D Shah
(74) *Attorney, Agent, or Firm* — Perry + Currier Inc.

(57) ABSTRACT

A set of instruments is divided into groups of instruments. Order data is received for the set of instruments. When an update interval elapses, a group is selected for update of a midpoint price. For each instrument in the group, a current midpoint price is computed based on order data received for the instrument. If the current midpoint price differs from a previous midpoint price, the current midpoint price is published.

21 Claims, 3 Drawing Sheets

(56) References Cited

U.S. PATENT DOCUMENTS

| | | |
|---|---|---|
| 2015/0032594 A1* | 1/2015 | Lutnick .................. G06Q 40/04 705/37 |
| 2017/0308956 A1 | 10/2017 | Bartko et al. |
| 2019/0156419 A1 | 5/2019 | Kuhnle et al. |
| 2019/0355064 A1 | 11/2019 | Norman |
| 2021/0090169 A1 | 3/2021 | Wang et al. |
| 2021/0192617 A1 | 6/2021 | Foley et al. |
| 2022/0044314 A1 | 2/2022 | McDannel et al. |

* cited by examiner

| BIDS | | OFFERS | | MIDPOINT |
|---|---|---|---|---|
| 128.5 | 1000 | 128.7 | 2500 | 128.6 |
| 128.4 | 2000 | 128.9 | 1300 | |

| | | | |
|---|---|---|---|
| 126.7 | 1500 | 129.0 | 500 |

FIG. 3

MIDPOINT COMPUTATIONS AT INTERVALS WITH BALANCED GROUPS

FIELD

The present disclosure relates to computerized trading systems and computerized data publication or distribution systems.

BACKGROUND

Computer systems often operate on quantities of data. It is often the case that computations need to be performed on large amounts of data at a high rate to maintain the data integrity and communications effectiveness of large systems.

SUMMARY

Methods, computing devices, and non-transitory machine-readable media are described herein, in which a set of instruments is divided into groups of instruments. Order data is received for the set of instruments. When an update interval elapses, a group is selected for update of a midpoint price. For each instrument in the group, a current midpoint price is computed based on order data received for the instrument. If the current midpoint price differs from a previous midpoint price, the current midpoint price is published.

The set of instruments may be divided into the plurality of groups of instruments comprises balancing activity among the groups.

The group may be selected according to a predetermined sequence of the plurality of groups.

The update interval may be selected from a range of 0.1 seconds to 10 seconds.

The update interval may be 1 second.

The number of groups may be selected from a range of 3 to 20.

The number of groups may be 10.

BRIEF DESCRIPTION OF THE DRAWINGS

FIG. 3 is a table showing example order book prices and volumes with an example midpoint price.

DETAILED DESCRIPTION

Computer systems that process financial data are no exception to the need to perform computations quickly and efficiently. It is important to provide accurate data quickly, so that human-operated and automated market participant systems can properly generate and route orders.

This disclosure relates to technical solutions to perform midpoint price computations accurately, quickly, and efficiently in a system of networked computers. Exchange-traded funds (ETFs) are referenced as an example. However, it should be understood that the techniques discussed herein may be applied to other instruments.

A midpoint price for an ETF may be determined based on order data instead of trade data. Specifically, as part of a real-time ETF trading, multiple orders are received, and a calculation of midpoint price may be performed in real time at an interval using order data. Using order data increases price accuracy in the event that trades are relatively sparse, which may cause trade prices to go stale and not accurately reflect true market conditions. A high order-to-trade ratio may be more common for ETFs compared to other instruments, such as single-issue stocks. ETFs may also be divided into different groups based on activity (e.g., frequency of orders), and the midpoint price may be sequentially calculated for each of the different groups to balance total computational load. Further, a system may refrain from publishing a new midpoint price until the price has changed.

Figure 1:
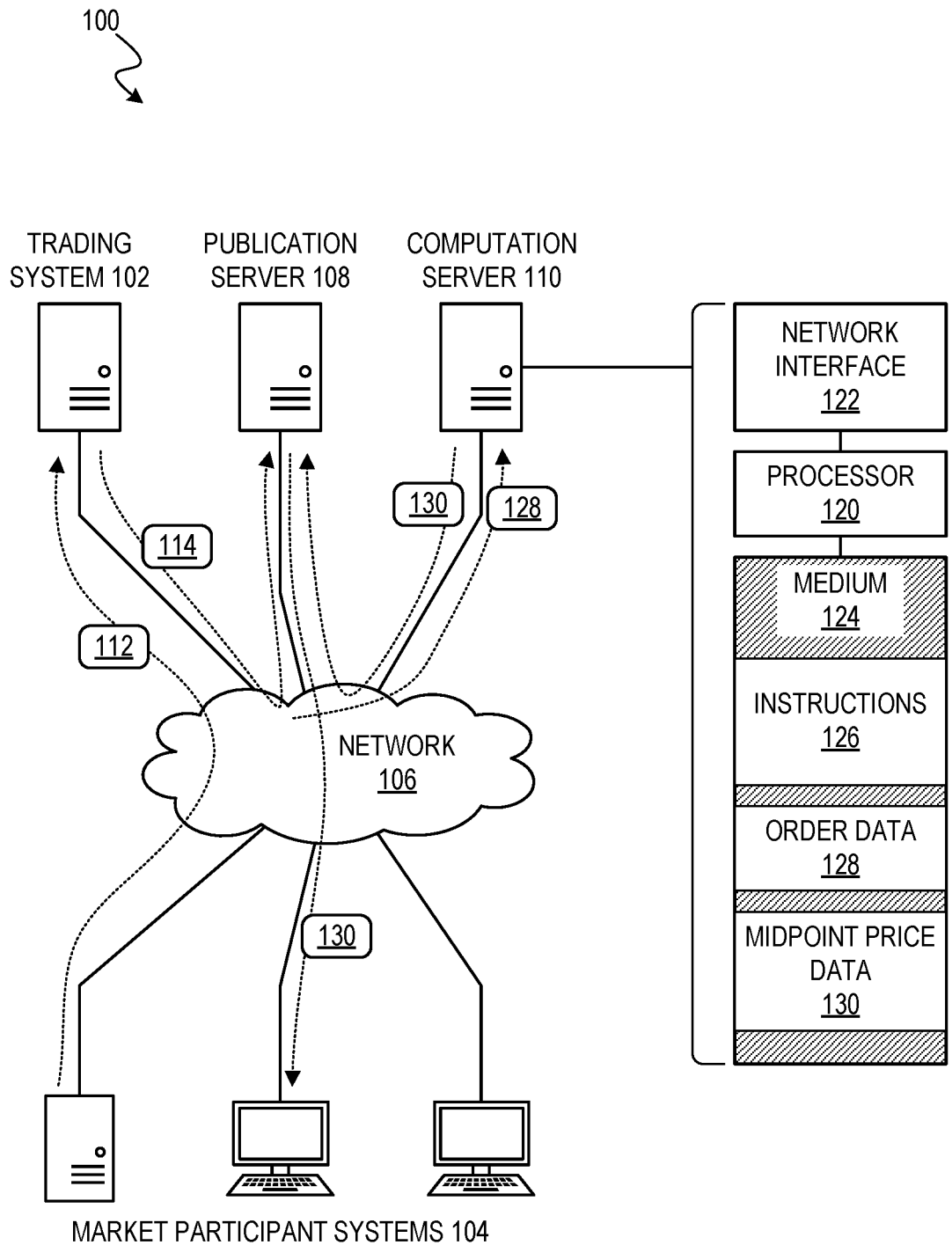
FIG. 1 is a diagram of an example system to compute and publish a midpoint price to client terminals via a wide-area computer network.

With reference to FIG. 1, a computer system 100 includes an electronic trading system 102, a plurality of market participant systems 104, a computer network 106, a publication server 108, and a computation server 110. The trading system 102, market participant systems 104, publication server 108, and computation server 110 are connected to the computer network 106.

The electronic trading system 102 includes a special-purpose computer with a processor and non-transitory machine-readable medium to receive, match, and fill orders received from the market participant systems 104. Such orders may include new orders and cancelations and may take the form of electronic order messages 112. The trading system 102 may facilitate the trading of a plurality of different financial instruments, such as ETFs, stocks, funds, bonds, etc., under various symbols or identifiers.

Each market participant system 104 may include a general-purpose or special-purpose computer with a processor and non-transitory machine-readable medium to receive input data and provide output data related to trades to be carried out at the trading system 102. A market participant system 104 may include a server, terminal, or similar computing device that generates order messages 112 and consumes market data, such as midpoint price data 130. A market participant system 104 may be operated by a person, may be partially automated, or may be fully automated (e.g., running a trading program with little to no human intervention). A market participant system 104 may also be referred to as a vendor trading system, bank trading system, or trading desk.

The computer network 106 may include a local-area network (LAN), wide-area network (WAN), virtual private network (VPN), a mobile network, the internet, or a combination of such. The computer network 106 may be wired, wireless, or both.

The publication server 108 includes a special-purpose computer with a processor and non-transitory machine-readable medium to obtain order and/or trading data 114 from the trading system 102 and publish related market data 128 in human- or machine-intelligible formats.

Market data provided by the publication server 108 may include trade data, such as trade price, trade volume, and trade time; and order message data, such as order type (e.g., new, modification, or cancelation), order side, order price, order volume, order time, order condition (e.g., limit or stop conditions), etc. Market data may be provided for various different financial instruments. The publication server 108 may publish the market data in real time.

The computation server 110 includes a special-purpose computer with one or more processors 120, network interface 122, and non-transitory machine-readable medium 124. The medium 124 stores instructions 126 that are executable by the one or more processors 120. The medium 124 may further store order data 128 as input to the instructions 126 and midpoint prices 130 as output of the instructions 126.

The one or more processors 120 includes a central processing unit (CPU), a microprocessor, a processing core, an FPGA (e.g., the processor and medium may be the same device), an application-specific integrated circuit (ASIC), or a similar device capable of executing the instructions. The terms "a" and "the" processor, as used herein, mean one or more processors that collectively execute instructions. "One or more processors" may herein be referred to as "the processor" for sake of brevity. When multiple processors are used, one process may execute some instructions and another processor may execute other, different instructions.

The processor 120 cooperates with the medium 124 and may also cooperate with another non-transitory machine-readable medium that includes a volatile memory, such as a random-access memory (RAM), to execute the instructions 126.

The network interface 122 includes hardware, such as a network adaptor, and software, such as a driver, to facilitate data communications via the computer network 106 and specifically with the trading system 102 and publication server 108.

The non-transitory machine-readable medium 124 may include an electronic, magnetic, optical, or other type of non-volatile physical storage device that encodes the instructions 126 that implement the functionality discussed herein. Examples of such storage devices include a non-transitory computer-readable medium such as a hard drive (HD), solid-state drive (SSD), read-only memory (ROM), electrically-erasable programmable read-only memory (EEPROM), or flash memory.

The instructions 126 may be directly executed, such as binary or machine code, and/or may include interpretable code, bytecode, source code, or similar instructions that may undergo additional processing to be executed. All of such examples may be considered executable instructions.

The instructions 126 process the order data 128 to obtain midpoint price data 130, as will be discussed in detail below.

Order data 128 is representative of electronic orders made by market participants with the electronic trading system 102. Order data 128 may be obtained directly from the trading system 102. Alternatively or additionally, order data 128 may be obtained from the publication server 108, which obtains order data from the trading system 102. Order data 128 may be temporarily stored at the computation server 110 for as long as needed.

Midpoint price data 130 may be computed from a best bid and offer represented by the order data 128. The computation server 110 may compute the midpoint price data 130 and transmit it to the publication server 108 for electronic publication. The midpoint price data 130 may be published in context with the order data 128 or other relevant data. The midpoint price data 130 may be obtained from the publication server 108 by the market participant systems 104 via the network 106 in context or separately. As will be discussed in detail below, the midpoint price data 130 may be computed at intervals in groups according to a sequence and the groups may be balanced based on activity, so as to reduce processing requirements at the computation server 110 and bandwidth requirements of the network 106.

The arrangement of servers 102, 108, 110 and their respective functions is merely one example. In other examples, the functions of the publication server 108 and computation server 110 are combined. That is, the publication server 108 both publishes market data and performs midpoint computations with the instructions 126. In still other examples, the functions of the trading system 102 and computation server 110 are combined. That is, the trading system 102 receives orders, performs trades, and performs midpoint computations with the instructions 126.

Figure 2:
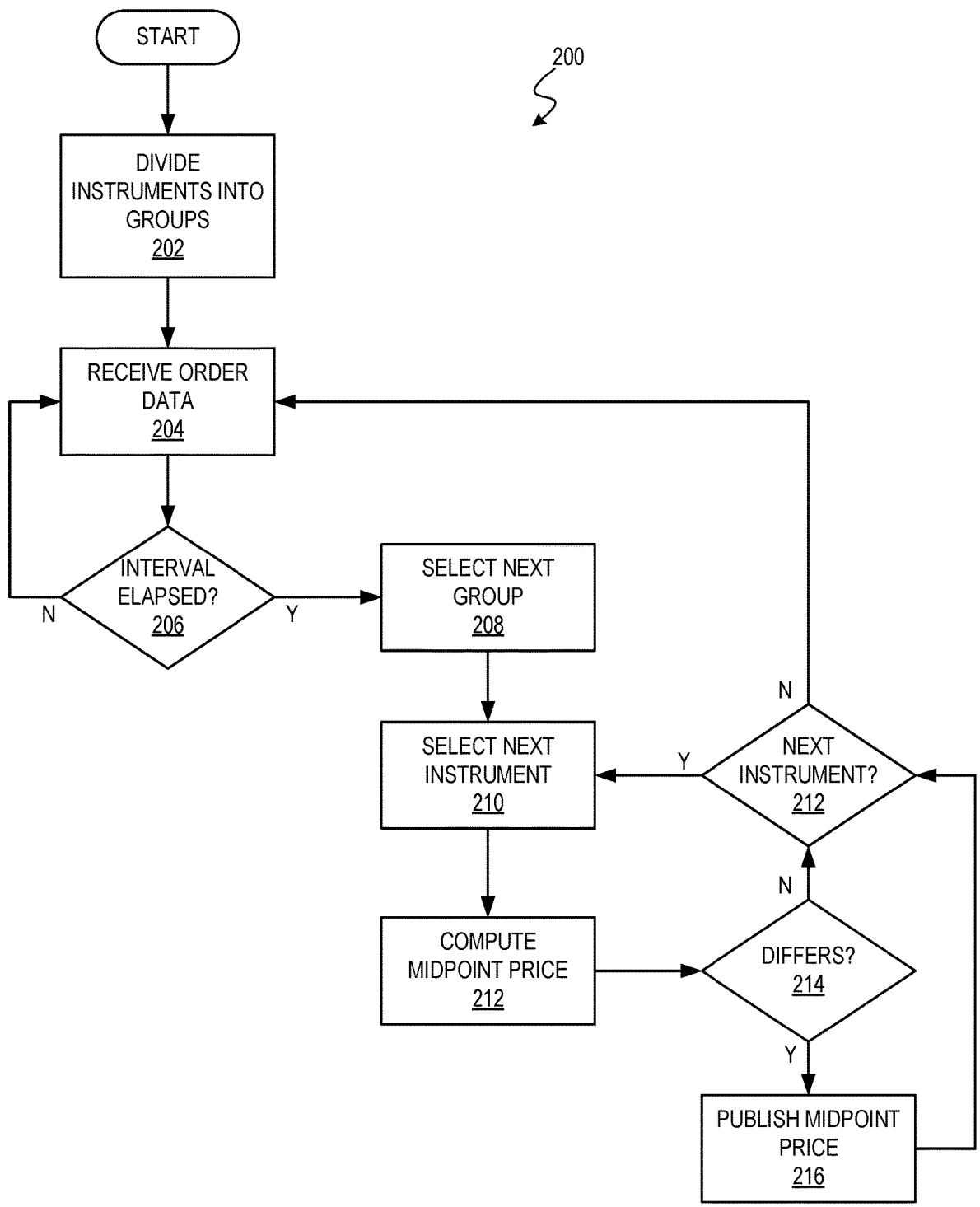
FIG. 2 is a flowchart of an example method to compute and publish a midpoint price to client terminals via a wide-area computer network.

FIG. 2 shows an example method 200 to compute midpoint prices. The method 200 may be implemented with a server, such as the server 110 of FIG. 1, by processor-executable instructions, such as the instructions 126 of FIG. 1, and may be operable within a computer system, such as the system 100 of FIG. 1. Although the method 200 is not limited to a particular system, FIG. 1 and related description may be referenced for further discussion that is not repeated here for sake of brevity, with like terminology and reference numerals denoting like components.

At block 202, a set of instruments, such as ETFs, are divided into a plurality of groups. This may include balancing activity among the groups. Instruments with a high degree of order activity may be assigned to different groups. In one example, instruments are ranked based on activity and each instrument is assigned to a group in order of its rank. For example, with 10 groups, the highest ranked instrument is assigned to group 1, the next highest to group 2, and so on, with the 11th, 21st, etc. highest-activity instruments assigned to group 1, the 12th, 22rd, etc. highest assigned to group 2, and so on until all instruments of the set are assigned to a group. In various examples, the number of groups ranges from 3 to 20. In some examples, the number of groups is 10 for a set of about 1,150 ETFs, meaning that each group contains about 115 ETFs. Further, due to the balancing methodology, each group has approximately the same average activity.

The assignments of instruments to groups may be done periodically or regularly at a frequency lower than the frequency at which the remainder of method 200 is performed. For example, if blocks 208, etc. are performed once per second, then block 202 may be performed once per day, week, or month.

The groups may be ordered into a sequence, such as by number (e.g., group 1, group 2, group 3, etc.). The sequence may be static for purposes of blocks 208, etc. and may be updated when the contents of the groups are updated.

At block 204, order data is received for the set of instruments. Orders may be originally received by an electronic trading system 102 as part of the operation of the electronic trading system 102. Order data relevant to midpoint computation may be extracted from orders and provided to a server that performs the method 200, if not performed by the electronic trading system 102 itself. Order data is used for the midpoint computation whether or not a trade has occurred.

At block 206, an update interval is monitored. The method 200 continually receives order data, at block 204, until the update interval elapses. Orders or order data may still be received after the update interval elapses, but such data may not be included in the processing of blocks 208, etc., until the next cycle. Example update intervals range from 0.1 seconds to 10 seconds. In various examples, the update interval is 1 second.

At block 208, in response to the update interval elapsing, the next group is selected. As mentioned above, the groups of instruments may be assigned a sequence. The next group in the sequence is selected. The selection of groups is cyclic, so the first group is selected again when the end of the sequence is reached.

Via blocks 210 and 212, each instrument in the selected group is processed. A next instrument is selected until all instruments in the group have been processed.

At block 212, a current midpoint price for the instrument is computed based on order data received for the instrument. The computation may be performed as the average of the best bid price and the best offer price (i.e., top of book, see FIG. 3), irrespective of any trades that may or may not have occurred. If no order data was received for the instrument, then the computation may be skipped. In addition, if only either a bid(s) or offer(s) exists (i.e., a one-way market), the computation is skipped. That is, the computation at block 212 may be limited to orders that establish a two-way market.

At block 214, if the current midpoint price differs from a previous midpoint price, then the current midpoint price is electronically published, at block 216. This may include transmitting the midpoint price to a publication server 108. If the current midpoint price does not differ from a previous midpoint price, then publication is bypassed. Instead, the previous publication of a midpoint price stands.

Once all instruments in the group have been processed, the method returns to block 204 to continue to receive order data until the interval elapses again, at block 206. Then, the next group of instruments is processed via blocks 208-216. The groups are continually cycle through in this manner to continually calculate midpoint prices.

In the example of 10 groups updated at an interval of 1 second, the time to update all instruments in the set is thus 10 seconds. Each of the approximately 1150 instruments in this example has its midpoint price updated at a frequency of once per 10 seconds.

The method 200 may be performed throughout a trading day, so that accurate midpoint price data is continually provided to market participants. There may be periods during the trading that that the method 200 is paused, such as a few minutes before and/or after trading begins and ends. In various examples, with an example trading day of 9:30 AM to 4:00 PM, the method 200 may be performed from 7:00 AM to 3:57 PM and temporarily halted between 9:27 AM to 9:33 AM, so as to reduce demand on network resources, which can be quite high around market open and market close. An embargo on the computation and/or its publication lasting several minutes (e.g., 1 to 5 minutes) before and/or after the beginning of the trading day and before the end of the trading day may thus be useful. Messages bearing requests for computed midpoints (e.g., requests to the server 110 of FIG. 1) may be suppressed or ignored.

The techniques discussed above provide an efficient way to update midpoint prices based on orders rather than trades. The volume of order data is typically large and often much larger than trade data. Hence, rather than update as midpoint price as an order is received, which could cause unpredictable spikes in demand for computational resources, a computation is performed at intervals on balance groups of instruments. In the example of a collection of ETFs, it has been found that about 1% of ETFs account for over 60% of trading, while as much as 17% of ETFs do not trade on a daily basis, with the balance of ETFs trading about one to three times per day. The techniques discussed herein base midpoint price on orders, which are often more frequent than trades, so that infrequently traded ETFs do not suffer as much from stale prices. Further, balanced groups and interval-based computations provide for accuracy while reducing computational and network loads, in that frequently traded ETFs are provided with accurate pricing without undue strain on resources.

It should be recognized that features and aspects of the various examples provided above can be combined into further examples that also fall within the scope of the present disclosure.

The invention claimed is:

1. A computer-implemented method for balancing computational load in an electronic trading system comprising:
   receiving, by one or more processors, via a network interface, order data for a predefined set of instruments;
   storing, in a memory accessible to the one or more processors, an activity metric for each instrument indicative of at least one of order volume or order frequency;
   dividing the set of instruments into a plurality of groups by distributing instruments among the groups so that each group has substantially the same activity metric;
   monitoring an update interval; and
   in response to the update interval elapsing, selecting, in a predetermined sequence, a group from the plurality of groups of instruments;
   for each instrument in the group:
   computing a current midpoint price for the instrument based on the order data received for the instrument; and
   if the current midpoint price differs from a previous midpoint price, electronically publishing the current midpoint price via the network interface,
   wherein, due to said dividing, each time the computing occurs for the selected group, a substantially equal measure of at least one of: (i) processing resources provided by the one or more processors, and, (ii) bandwidth resources provided by the network interface is consumed, relative to computing that occurs for each of a remainder of the groups.

2. The method of claim 1, wherein dividing the set of instruments into the plurality of groups of instruments comprises balancing activity among the groups.

3. The method of claim 1, wherein the group is selected according to a predetermined sequence of the plurality of groups.

4. The method of claim 1, wherein the update interval is selected from a range of 0.1 seconds to 10 seconds.

5. The method of claim 4, wherein the update interval is 1 second.

6. The method of claim 1, wherein the number of groups is selected from a range of 3 to 20.

7. The method of claim 6, wherein the number of groups is 10.

8. A computing device comprising:
   a network interface; one or more processors connected to the network interface, the one or more processors configured to collectively:
   receive, by one or more processors, via a network interface, order data for a predefined set of instruments;
   store, in a memory accessible to the one or more processors, an activity metric for each instrument indicative of at least one of order volume or order frequency;
   divide the set of instruments into a plurality of groups by distributing instruments among the groups so that each group has substantially the same activity metric; monitor an update interval; and
   in response to the update interval elapsing, select, in a predetermined sequence, a group from the plurality of groups of instruments;
   for each instrument in the group: compute a current midpoint price for the instrument based on order data received for the instrument; and if the current midpoint price differs from a previous midpoint price, electronically publish the current midpoint price via the network interface. wherein, due to the divide, each time the computing occurs for the selected group, a substantially equal measure of at least one of: (i) processing resources provided by the one or more processors, and, (ii) bandwidth resources provided by the network interface is consumed, relative to computing that occurs for each of a remainder of the groups.

9. The computing device of claim 8, wherein the one or more processors is configured to collectively divide the set of instruments into the plurality of groups of instruments by balancing activity among the groups.

10. The computing device of claim 8, wherein the one or more processors is configured to collectively select the group according to a predetermined sequence of the plurality of groups.

11. The computing device of claim 8, wherein the update interval is selected from a range of 0.1 seconds to 10 seconds.

12. The computing device of claim 11, wherein the update interval is 1 second.

13. The computing device of claim 8, wherein the number of groups is selected from a range of 3 to 20.

14. The computing device of claim 13, wherein the number of groups is 10.

15. A non-transitory machine-readable medium comprising instructions that, when executed by one or more processors, cause the one or more processors to collectively:
receive, by one or more processors, via a network interface, order data for a predefined set of instruments;
store, in a memory accessible to the one or more processors, an activity metric for each instrument indicative of at least one of order volume or order frequency;
divide the set of instruments into a plurality of groups by distributing instruments among the groups so that each group has substantially the same activity metric;
monitor an update interval; and
in response to the update interval elapsing, select, in a predetermined sequence, a group from the plurality of groups of instruments;
for each instrument in the group: compute a current midpoint price for the instrument based on order data received for the instrument; and
if the current midpoint price differs from a previous midpoint price, electronically publish the current midpoint price; wherein, due to the divide, each time the computing occurs for the selected group, a substantially equal measure of at least one of: (i) processing resources provided by the one or more processors, and, (ii) bandwidth resources provided by the network interface is consumed, relative to computing that occurs for each of a remainder of the groups.

16. The non-transitory machine-readable medium of claim 15, wherein the instructions are to divide the set of instruments into the plurality of groups of instruments by balancing activity among the groups.

17. The non-transitory machine-readable medium of claim 15, wherein the instructions are to select the group according to a predetermined sequence of the plurality of groups.

18. The non-transitory machine-readable medium of claim 15, wherein the update interval is selected from a range of 0.1 seconds to 10 seconds.

19. The non-transitory machine-readable medium of claim 18, wherein the update interval is 1 second.

20. The non-transitory machine-readable medium of claim 15, wherein the number of groups is selected from a range of 3 to 20.

21. The non-transitory machine-readable medium of claim 20, wherein the number of groups is 10.

* * * * *